United States Patent [19]

Vancraeynest

[11] Patent Number: 5,186,471

[45] Date of Patent: Feb. 16, 1993

[54] INTERACTIVE TELEPHONE GAMING SYSTEM

[75] Inventor: Jan Vancraeynest, White Plains, N.Y.

[73] Assignee: Nynex Corporation, New York, N.Y.

[21] Appl. No.: 719,146

[22] Filed: Jun. 21, 1991

[51] Int. Cl.[5] ............................................. A63F 9/24
[52] U.S. Cl. ................................... 273/439; 273/460; 273/445; 379/90
[58] Field of Search ............... 273/439, 433, 460, 237, 273/856, 445; 379/52, 88, 90, 93, 97; 364/410, 412

[56] References Cited

U.S. PATENT DOCUMENTS

| | | | |
|---|---|---|---|
| 4,207,087 | 6/1980 | Morrison et al. | 273/460 |
| 4,285,517 | 8/1981 | Morrison | 273/1 |
| 4,372,558 | 2/1983 | Shimamoto et al. | 273/238 |
| 4,754,474 | 6/1988 | Feinson | 379/97 |
| 4,845,739 | 7/1989 | Katz | 379/92 |
| 4,959,783 | 9/1990 | Scott et al. | 364/412 |
| 4,969,183 | 11/1990 | Reese | 379/88 |

*Primary Examiner*—Theatrice Brown
*Assistant Examiner*—Jessica J. Harrison
*Attorney, Agent, or Firm*—Loren Swingle; John J. Torrente

[57] ABSTRACT

A gaming apparatus for use with a telephone network which supports standard DTMF tones and to which is connected telephone stations capable of generating standard DTMF tones wherein the gaming apparatus generates and transmits DTMF tones to a calling telephone station, receives response DTMF tones from a player at the calling station and compares the transmitted and received DTMF tones to determine if there is a match.

19 Claims, 3 Drawing Sheets

INTERACTIVE TELEPHONE GAMING SYSTEM

FIELD OF THE INVENTION

This invention relates to a gaming system and, in particular, to a gaming system which is interactive in nature.

There are various games known where an individual player can play a game by interacting with a machine. One such example is disclosed in U.S. Pat. No. 4,285,517, entitled Adaptive Microcomputer Controlled Game, wherein a microprocessor based gaming device generates random audible tones which must be responded to by an individual player. The microprocessor adaptively adjusts the level of difficulty depending upon the player's proficiency in responding, thereby maintaining the player's interest in the game.

The gaming device of the '517 patent is a dedicated device that must be played by a player at the physical location of the device. This limits the usefulness of the game, since only limited numbers of players would typically have access to a game's location.

There exist other gaming devices in which players, located remote from each other, can play a game by communicating coded information relating to the state of the game over a telephone system. By way of example, in U.S. Pat. No. 4,372,558, entitled Remote Gaming Apparatus, each player has a dedicated game apparatus for detecting and displaying the position of game pieces (i.e., chess pieces). Each dedicated gaming apparatus has communications hardware for transmitting and receiving over the phone system coded information relating to the position of the game pieces. In this manner, each dedicated gaming apparatus displays the current position of the game pieces as effected by both players.

Due to the need in the system of the '558 patent of each player having to use a dedicated or specialized gaming apparatus at his or her respective location, this gaming system is also of limited usefulness. Further, since the gaming system requires concurrent cooperation of two players, individuals are precluded from game playing until an available partner, also having a dedicated gaming apparatus, is found.

It is therefore an object of the present invention to provide a gaming apparatus and system which is easily accessible to large numbers of players.

It is a further object of the present invention to provide a gaming apparatus and system in which access to the gaming system does not require dedicated or specialized equipment.

SUMMARY OF THE INVENTION

In accordance with the principles of the present invention, the above and other objectives are realized in an interactive gaming apparatus which is adapted for use with a telephone network. The telephone network supports transmission of standard dual-tone multi-frequency (DTMF) tones to and from telephone stations and devices served by the network and the gaming apparatus makes use of such DTMF tones for game play with players using the telephone stations.

More particularly, the gaming apparatus comprises means for generating and transmitting standard DTMF tones over the telephone network to a player at a telephone station which has accessed or called the gaming apparatus. The apparatus also includes means for receiving and decoding DTMF tones originating at the called telephone station and selected by the player. Comparing means at the gaming apparatus compares the DTMF tones selected by the player with those transmitted by the gaming apparatus.

Once this comparison is made, the gaming apparatus can either end the game and provide an indication to the player that the player has won or lost (i.e., has matched or failed to match the DTMF tones transmitted by the gaming apparatus) or the gaming apparatus can continue the game with the transmission of further DTMF tones which have to be again responded to and matched by the player. In the latter case, the gaming apparatus can adaptively change the selection and the duration of the DTMF tones in each subsequent transmission. In this way, the game remains challenging regardless of the players proficiency, thereby promoting continued game play.

In an embodiment of the invention to be described hereinafter, the gaming apparatus includes a control means which effects overall control of the transmission means, receiving means and the comparing means. The control means permits variation of the interaction between the player and the gaming apparatus so that a variety of different forms of the game can be played.

As the communication between the telephone stations and the gaming apparatus is by way of standard DTMF tones which are presently supported by existing telephone networks and telephone stations, the gaming apparatus can be made available to a significantly large number of players.

DESCRIPTION OF THE DRAWINGS

The above and other features and aspects of the present invention will become more apparent upon reading the following detailed description in conjunction with accompanying drawings, in which.

DETAILED DESCRIPTION OF THE INVENTION

Figure 1:
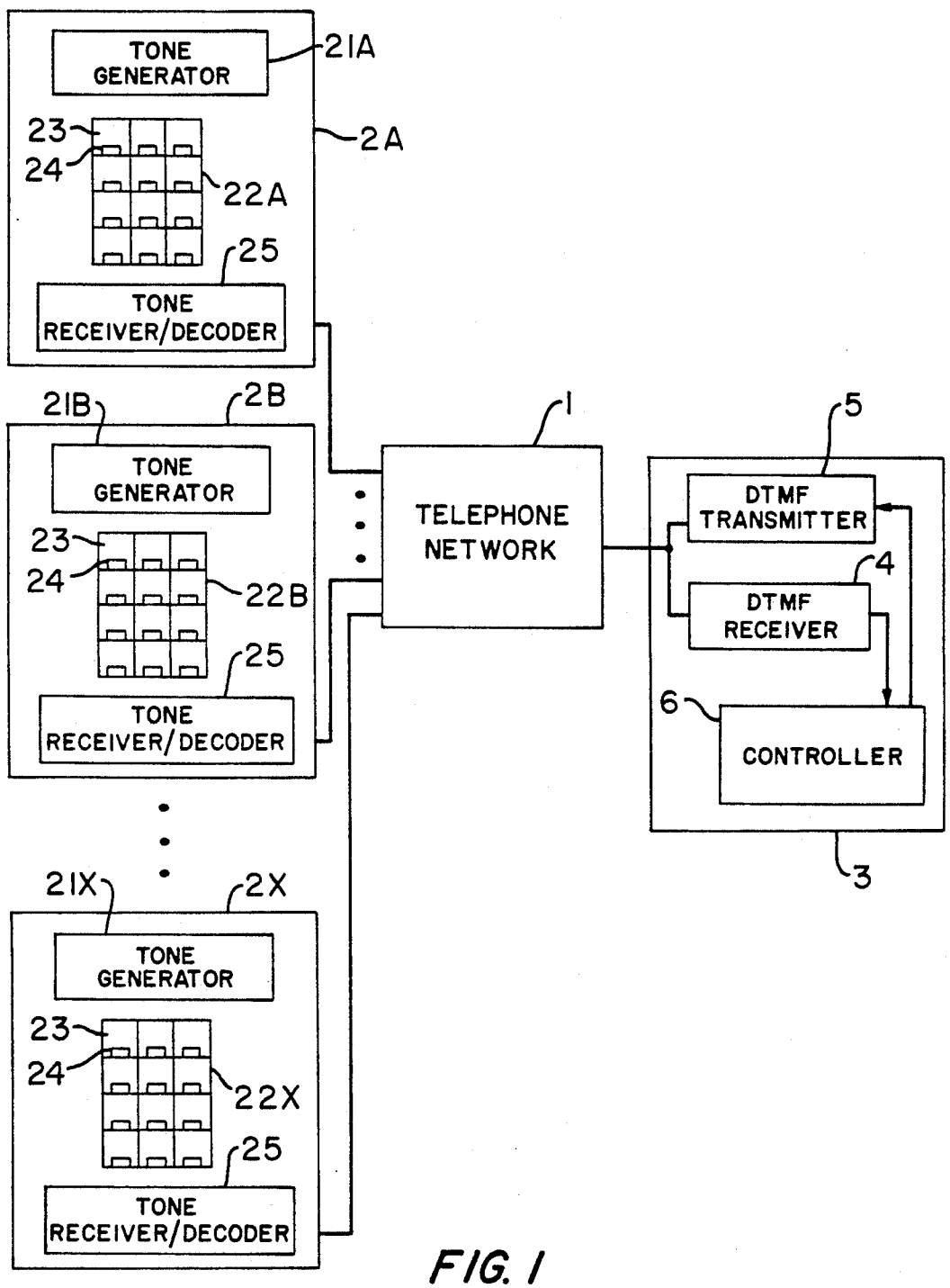
FIG. 1 shows a gaming system in accordance with the principles of the present invention.

FIG. 1 shows a telephone network 1 for carrying communication signals between various devices. The telephone network 1 is of a standard type and supports both voice transmission and standard DTMF tone transmission over the communication paths established through the network. The network can be accessed via a large number of telephone stations, shown as stations 2A-2X, which are adapted to provide signaling over the network using standard DTMF tones generated by tone generators 21A-21X included in the stations. The stations also have keypads 22A-22X whose keys 23 when pressed result in the desired tone generation.

Also connected to the network 1 is a gaming apparatus 3 which is designed in accordance with the principles of the present invention. The gaming apparatus 3 can be accessed or called by any one of the telephone stations 2A-2X by a player selecting the number assigned by the telephone network 1 to the gaming apparatus. When a call is placed to the gaming apparatus 3 from a telephone station, the telephone network 1 forms in a well known manner a communication path between the calling telephone station and the gaming apparatus 3 over which voice signals and standard DTMF tones can be bidirectionally transmitted.

As will be discussed in greater detail below, the gaming apparatus 3, responds to a call by initiating a game sequence. In particular, the gaming apparatus generates and transmits a sequence of standard DTMF tones to the player at the calling station. The player must then respond by attempting to duplicate or match the transmitted tones within a predetermined time. The player does this by actuating a sequence of the keys 23 at the calling station.

The gaming apparatus 3 then receives the DTMF tones generated by the player and determines whether the tones match the tones previously transmitted by the apparatus. Based on this comparison, the gaming apparatus 3 then can either generate a new sequence of DTMF tones to be matched or can end the game by sending a "WIN" or "LOSE" indication to the player.

As shown in FIG. 1, the gaming apparatus comprises a DTMF transmitter 5 for selectively generating and transmitting onto the network 1 standard DTMF tones. A controller 6 controls the operation of the gaming apparatus including the selection of tones to be transmitted by the transmitter 5 as well as the duration of the transmission. The gaming apparatus further comprises a DTMF receiver 4 for receiving and decoding DTMF tones received over the telephone network from the telephone stations 2A-2X. The DTMF receiver 4 outputs to the controller 6 signals indicating which DTMF tones are received and the controller 6 includes means for comparing the received tones with those transmitted by the apparatus.

The DTMF receiver 4 and the DTMF transmitter 5 can be implemented using readily available integrated circuits such as Silicon System Inc.'s SSI75T2089 DTMF transceiver. The controller 6 can be a general purpose computer programmed to perform the controller functions described herein or can be dedicated hardware designed to implement such functions.

Figure 2:
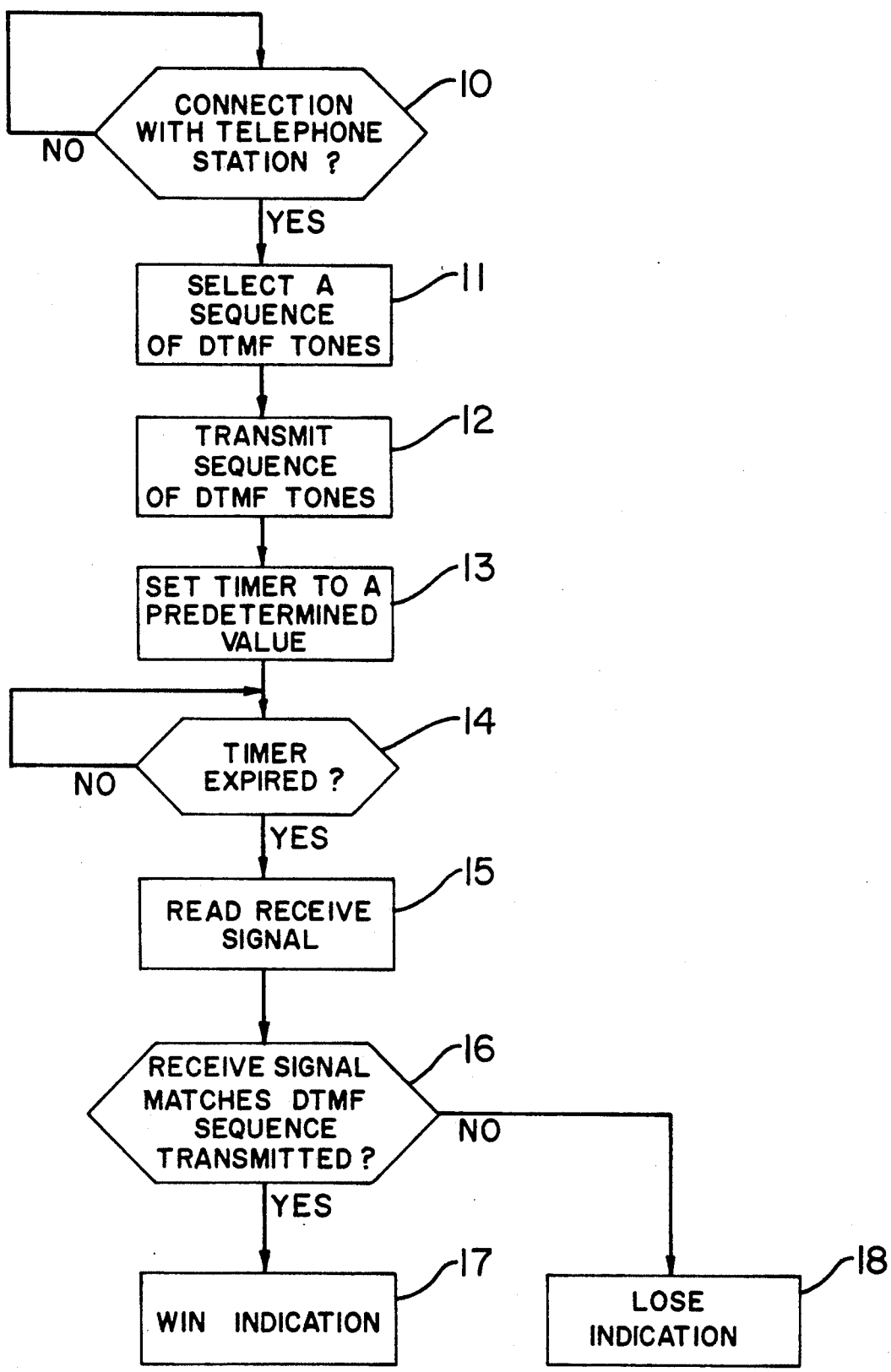
FIG. 2 shows a flowchart of the operation of the gaming apparatus of the gaming system shown in FIG. 1.

FIG. 2 is a flowchart showing the operation of the controller 6 in accordance with one illustrative embodiment of the present invention.

In STEP 10,—CONNECTION WITH TELEPHONE STATION—, the controller 6 determines whether a connection over the telephone network 1 has been made between the gaming apparatus and a calling telephone station. If yes, the controller 6 proceeds to step 11.

In STEP 11,—SELECT A SEQUENCE OF DTMF TONES—, the controller 6 selects a sequence of standard DTMF tones to be transmitted. The sequence may be selected by a random or pseudo random number generator or may be selected out of a table of sequences of DTMF tones stored in the controller's memory. The length of the sequence selected can also be varied by the controller so as to increase or decrease the difficulty level of the game.

In STEP 12,—TRANSMIT SEQUENCE OF DTMF TONES—, the controller 6 directs the DTMF transmitter 5 to transmit to the calling telephone station each of the DTMF tones contained in the sequence of DTMF tones selected in step 11 for a given duration determined by the controller. The difficulty of the game can be changed by the controller 6 changing the duration of transmission of one or more of the transmitted tones.

In STEP 13,—SET TIMER TO PREDETERMINED VALUE—, a timer is set to a predetermined value corresponding to the time period in which a response from the player at the calling telephone is required.

In STEP 14,—TIMER EXPIRED? —, the program remains at step 14 until the time period has expired, at which time the program proceeds to step 15. In the meantime, any received DTMF signals are buffered and held for comarison.

In STEP 15,—READ RECEIVE SIGNAL—, the controller 6 reads signals at the DTMF receiver 4. These signals are indicative of the DTMF tones transmitted by the player at the calling telephone station and received by the DTMF receiver 4, during the predetermined time period set in step 13.

In STEP 16,—RECEIVE SIGNAL MATCHES DTMF SEQUENCE TRANSMITTED? —, the signals from the receiver are compared against the sequence of DTMF tones selected in step 11. If the comparison indicates that the player's DTMF tone sequence matches or duplicates the tone sequence of the gaming apparatus, the program proceeds to step 17, and if the comparison indicates that there is no match, the program proceeds to step 18.

In STEP 17,—WIN INDICATION—, the player has correctly matched the sequence, therefore, the controller 6 sends a WIN indication to the player. The WIN indication can be, for example, the transmission of a predetermined sequence of DTMF tones or may be the transmission of a voice synthesized voice message, not requiring additional equipment at the player's telephone station.

In STEP 18,—LOSE INDICATION—, the player has not correctly matched the sequence within the predetermined time allotted, and therefore, the controller unit sends a LOSE indication to the player. The LOSE indication can also be, for example, the transmission of a predetermined sequence of DTMF tones or the transmission of a synthesized voice message, not requiring additional equipment at the player's telephone station.

Figure 3:
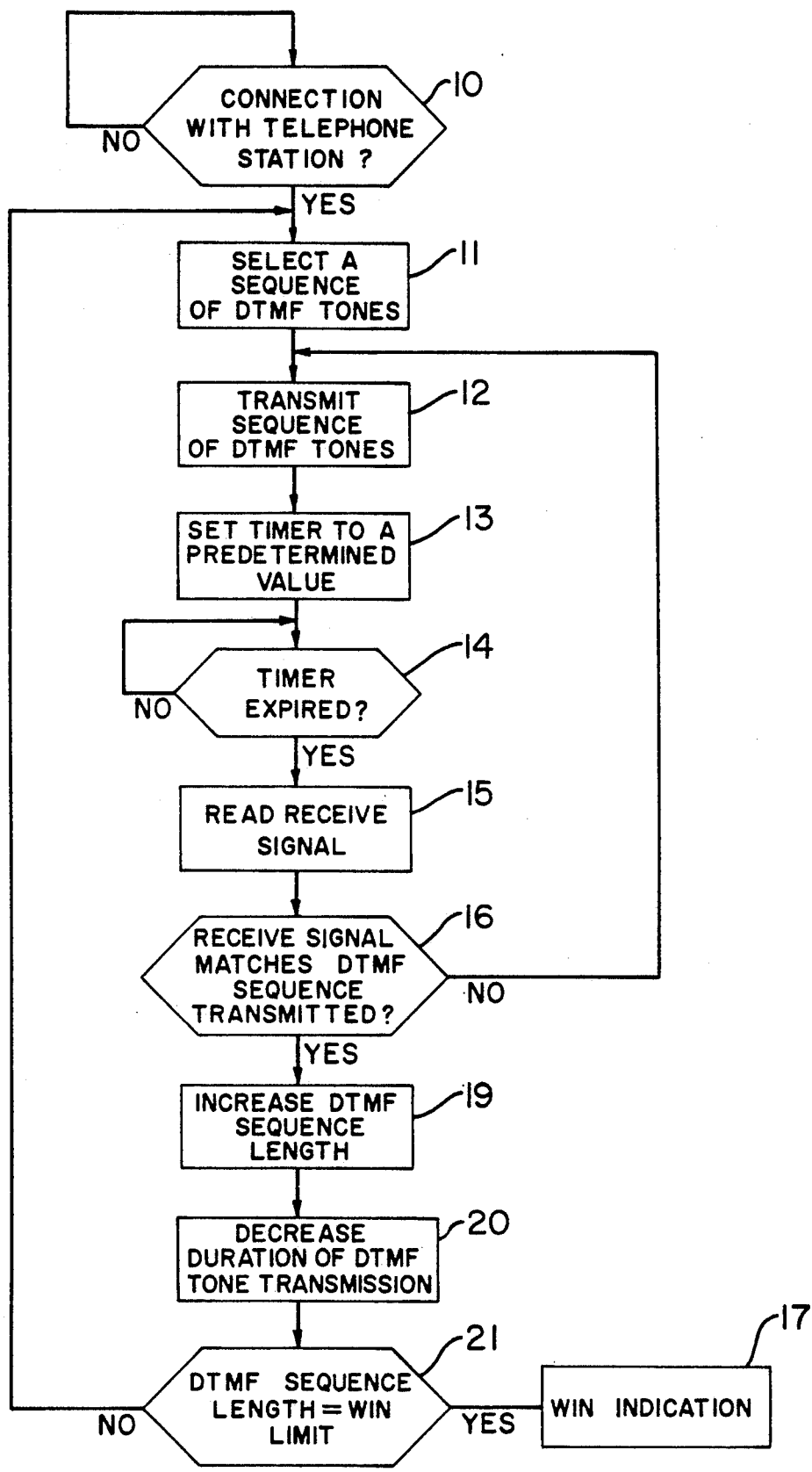
FIG. 3 is a flowchart showing an alternate operation for the gaming apparatus of the gaming system of FIG. 1.

FIG. 3 is a flowchart showing a variation of the operation of the controller 6 described in FIG. 2. In FIG. 3, steps which are the same as those shown in FIG. 2 are similarly numbered and their description, since it is given above, has not been repeated.

Steps 10-15 are the same as in FIG. 2.

In STEP 16,—RECEIVE SIGNAL MATCHES DTMF SEQUENCE TRANSMITTED? —, the signals from the receiver are compared against the sequence of DTMF tones selected in step 11. If the comparison indicates that the player's DTMF tone sequence matches or duplicates the tone sequence of the gaming apparatus, the program proceeds to step 19, and if the comparison indicates there is no match, the program returns to step 12 where the sequence of DTMF tones are retransmitted.

In STEP 19,—INCREASE DTMF SEQUENCE LENGTH—, the length of the sequence of DTMF tones to be set in step 11 is increased by one.

In STEP 20,—DECREASE DURATION OF DTMF TONE TRANSMISSION—, the duration of each DTMF tone in the sequence of tones to be transmitted in step 12 is decreased by a predetermined value.

In STEP 21,—DTMF SEQUENCE LENGTH=-WIN LIMIT—, the length of the DTMF sequence increased in step 19 is compared to a win limit value. If the sequence does not equal the win limit, progress is made to sep 11 where a new sequence is selected. If the sequence does equal the win limit progress is made to step 17.

Step 17 is the same as in FIG. 2.

In the operation of the controller 6 described in FIG. 3, depending upon whether the player correctly matches a given sequence, the next sequence transmitted is either the same or is adjusted so as to be longer and faster. In this way, the gaming apparatus dynamically adjusts for the skill level of the particular player, thereby making play more desirable.

While FIGS. 2 and 3 illustrate specific types of operation of the gaming apparatus 3 to realize two game variations playable with the apparatus 3, it can be appreciated that the programming of the controller unit 6 of the gaming apparatus can be changed to support any number of different types of games. For example, in a further variation, the game could be operated such that a player must continuously match the sequence of tones transmitted at a continuously increasing tempo (i.e., duration of each DTMF tone is reduced). The aforementioned '517 patent, whose teachings are hereby incorporated herein by reference, discloses numerous different types of games that could easily be adapted to the gaming apparatus of the present invention.

In a further modification of the present invention, the telephone stations 2A-2X of FIG. 1 can be modified so that each tone key 23 has a corresponding LED 24 (or other visual device) associated therewith. In such case, while a DTMF tone is being received by the telephone station, the LED corresponding to the tone key which if pressed would generate the received DTMF tone, is illuminated. In this way, it becomes possible to provide visual cues to the player located at the telephone station to assist the player in matching the auditory pattern of DTMF tones generated by the gaming apparatus 3.

In order to effect this modification of the invention, each telephone station can be provided with a DTMF receiver/decoder 25. The DTMF receiver/decoder provides a unique output signal for each standard DTMF tone received and these unique signals enable driving circuits driving the LEDs 24.

It should be noted that gaming apparatus and system described has been illustrated as supporting the play of only a single player or telephone station at a time. However, it is understood that the gaming apparatus can be dimensioned to concurrently support multiple telephone stations so that multiple games against different players can occur simultaneously.

In all cases it is understood that the above-identified arrangements are merely illustrative of the many possible specific embodiments which represent applications of the present embodiment. Numerous and varied other arrangements can readily be devised in accordance with the principles of the present invention without departing from the spirit and scope of the invention.

What is claimed is:

1. An interactive telephone gaming apparatus for use in a telephone network which supports transmission of standard DTMF tones to and from telephone stations connected to the network, the gaming apparatus comprising:

means for generating and transmitting one or more standard DTMF game tones to a telephone station over said telephone network;

means for receiving one or more standard DTMF telephone station tones from said telephone station over said telephone network; and control means controlling said generating and transmitting means and said receiving means and including comparing means for comparing the one or more DTMF telephone station tones received by said receiving means with the one or more DTMF game tones transmitted by said generating and transmitting means and for enabling signalling to be provided to said telephone station indicative of said comparison;

whereby upon said telephone station receiving the one or more game tones transmitted by said generating and transmitting means, a player at said telephone station can operate said telephone station to cause DTMF telephone station tones to be transmitted and received by said receiving means so that said signalling enabled by said control means is based on a comparison of whether said DTMF telephone station tones caused to be generated by said player match said game tones transmitted by said generating and transmitting means.

2. An interactive telephone gaming apparatus in accordance with claim 1 wherein:

said control means controls the selection of the one or more DTMF game tones generated by said generating and transmitting means.

3. An interactive telephone gaming apparatus in accordance with claim 2 wherein:

said control means controls the selection of the number of said one or more DTMF game tones and the duration of each of said DTMF game tones to be generated by said generating and transmitting means.

4. An interactive telephone gaming apparatus in accordance with claim 3:

said control means controls the selection of the number and duration of further DTMF game tones to be generated by said generating and transmitting means based on a comparison made by said comparing means.

5. An interactive telephone gaming apparatus in accordance with claim 3 wherein:

said control means forms a LOSE signal and a WIN signal if the comparison by said control means indicates that the received DTMF telephone station tones do not match and do match, respectively, said transmitted DTMF game tones.

6. An interactive telephone gaming apparatus in accordance with claim 5 wherein:

said control means causes the formed LOSE or WIN signal to be transmitted over said telephone network to said telephone station.

7. An interactive telephone gaming apparatus in accordance with claim 5 wherein:

said control means forms a WIN signal only after a preselected number of matches are determined by said control means.

8. A method for playing an interactive game using a telephone network which supports transmission of standard DTMF tones to and from telephone stations connected to the network, the method comprising:

generating and transmitting one or more standard DTMF game tones to a telephone station over the telephone network;

receiving one or more standard DTMF telephone station tones from said telephone station over said telephone network; and controlling said generating and transmitting step and said receiving step, said controlling further including comparing said one or more received DTMF telephone station tones with said one or more transmitted DTMF game tones and enabling signalling to be received by said telephone station indicative of said comparison;

whereby upon said telephone station receiving the one or more transmitted game tones, a player at said telephone station can operate said telephone station to cause DTMF telephone station tones to be transmitted and received so that said signalling enabled by said controlling step is based upon a comparison of whether said DTMF telephone station tones caused to be generated by said player match said game tones transmitted in said transmitting and generating step.

9. A method for playing an interactive game in accordance with claim 8 wherein:

said controlling step further includes forming a LOSE signal and a WIN signal if the comparison in said controlling step indicates that the received DTMF telephone station tones match and do not match, respectively, said transmitted DTMF game tones.

10. A method for playing an interactive game in accordance with claim 9 wherein:

said controlling steps further includes causing said formed LOSE or WIN signal to be transmitted over said network to said telephone station.

11. A method for playing an interactive game in accordance with claim 8 wherein:

said controlling step includes controlling the selection of the number of said one or more DTMF game tones and the duration of each of said DTMF game tones generated during said generating and transmitting step.

12. A method for playing an interactive game in accordance with claim 11 wherein:

said controlling further includes selecting the number and duration of further DTMF game tones to be generated and transmitted based on said comparison of said transmitted DTMF game tones and received DTMF telephone station tones.

13. An interactive telephone gaming system comprising:

a telephone network which supports transmission of standard DTMF tones;

one or more telephone stations connected to said telephone network, each station being able to generate standard DTMF telephone station tones;

and a gaming apparatus comprising: means for generating one or more standard DTMF game tones and for transmitting said DTMF game tones over said telephone network to a telephone station; means for receiving one or more standard DTMF telephone station tones from said telephone station over said telephone network; and control means controlling said generating and transmitting means and said receiving means and including comparing means for comparing the one or more DTMF telephone station tones received by said receiving means with the one or more DTMF game tones transmitted by said generating and transmitting means and enabling signalling to be provided to said telephone station indicative of said comparison;

whereby upon said telephone station receiving the one or more game tones transmitted by said generating and transmitting means, a player at said telephone station can operate said telephone station to cause DTMF telephone station tones to be transmitted and received by said receiving means so that said signalling enabled by said control means is based upon a comparison of whether said DTMF telephone station tones caused to be generated by said player match said game tones transmitted by said generating and transmitting means.

14. An interactive gaming system in accordance with claim 13 wherein:

said control means controls the selection of the number of said one or more DTMF game tones and the duration of each of said DTMF game tones to be generated by said generating and transmitting means.

15. An interactive gaming system in accordance with claim 14 wherein:

said control means controls the selection of the number and duration of further DTMF game tones to be generated by said generating and transmitting means based on a comparison made by said comparing means.

16. An interactive gaming system in accordance with claim 14 wherein:

said control means forms a LOSE signal and a WIN signal if the comparison by said control means indicates that the received DTMF telephone station tones do not match and do match, respectively, said transmitted DTMF game tones.

17. An interactive gaming system in accordance with claim 16 wherein:

said control means causes the formed LOSE or WIN signal to be transmitted over said telephone network to said telephone station.

18. An interactive gaming system in accordance with claim 13 wherein:

each of said telephones stations is able to receive and decode DTMF game tones and each includes means for providing an indication of each received DTMF game tone.

19. An interactive gaming system in accordance with claim 18 wherein:

said means for providing an indication of each received DTMF game tone of each telephone station provides a visual indication.

* * * * *